United States Patent
Chvatal

[11] 3,865,137
[45] Feb. 11, 1975

[54] REGULATOR VALVE

[75] Inventor: Milos Chvatal, Rochester, N.Y.

[73] Assignee: Bernz-O-Matic Corporation, Rochester, N.Y.

[22] Filed: May 26, 1972

[21] Appl. No.: 257,363

[52] U.S. Cl. ............................ 137/613, 137/505.43
[51] Int. Cl. ......................................... F16k 31/365
[58] Field of Search.......... 137/613, 505.42, 505.36, 137/505.43

[56] References Cited
UNITED STATES PATENTS

| 1,946,882 | 2/1934 | Russel | 137/505.36 X |
| 2,854,991 | 10/1958 | Webster | 137/322 |
| 3,094,141 | 6/1963 | Maienknecht | 137/505.43 X |
| 3,457,953 | 7/1969 | Warncke et al. | 505.42 X/ |
| 3,521,658 | 7/1970 | Sandow | 137/505.43 X |
| 3,521,669 | 7/1970 | Suchowolec | 137/613 X |

Primary Examiner—Charles J. Myhre
Assistant Examiner—Ira S. Lazarus
Attorney, Agent, or Firm—Burgess, Dinklage & Sprung

[57] ABSTRACT

An improvement in a regulator valve useful in connection with portable cylinders of LPG gas, which valve comprises a valve body, a gas inlet, a flow regulating means, a tire valve downstream of said flow regulator means, a chamber comprising a diaphragm, an air inlet to bias against said diaphragm on the opposite side of said diaphragm, and a gas exit, wherein the improvement resides in providing a unitary housing containing said air inlet and said gas outlet.

11 Claims, 2 Drawing Figures

… … …

REGULATOR VALVE

BACKGROUND OF THE INVENTION

1. Field of the Invention

This invention is directed to an improvement in a regulator valve useful in connection with portable LPG gas cylinders. More particularly, this invention is directed to an improvement in a regulator valve useful for portable torches, portable stoves, and other equipment where the energy is supplied from a portable LPG cylinder. This invention is particularly directed to a simple unitary structure wherein a regulator valve which maintains a constant pressure of LPG gas is provided such that pressure within the valve is regulated through use of an air inlet in out-of-contact relationship with the LPG gas flowing through the valve assembly. Pursuant to an embodiment of the invention, the air inlet is positioned in a housing containing the gas outlet for the valve assembly.

2. Discussion of the Prior Art

Numerous valve assemblies have been shown in the prior art, and such have been useful in connection with portable liquefied petroleum gas cylinders. Generally speaking, the art valves contain a gas inlet and a gas outlet. Positioned between the gas inlet and the gas outlet is a flow regulating valve, generally a needle valve. Downstream thereof, is a chamber in which is positioned a tire valve of the type used in automobile tires. Generally speaking, the needle or pin of the tire valve bears against a plate against which is positioned a diaphragm. Positioned on the other end of the diaphragm is a spring which controls the pressure in the areas or channels defined on the upstream side of the diaphragm. The purpose of such spring means is to regulate the pressure of the gas passing through the valve assembly. As shown in Webster patent, U.S. Pat. No. 2,854,991, there is provided an air inlet which biases against the diaphragm to facilitate control of the pressure of the LPG passing through the regulator assembly against the ambient conditions outside of the valve assembly.

Another type of valve assembly is shown in the Suchowolec et al U.S. Pat. No. 3,521,669. Therein a diaphragm is used which has a spring biasing thereagainst. In both the Webster and Suchowolec et al apparatuses, the spring is maintained in a housing separate from the housing containing the gas exit. Thus, the apparatuses tend to become more bulky than has been found in the present circumstances. More will be said about this in the ensuing specification.

SUMMARY OF THE INVENTION

Broadly, this invention contemplates an improvement in a gas regulator valve comprising a gas inlet, a flow regulating means, a tire valve bearing against a plate, which plate defines at least one gas passageway, which plate is spring biased by a spring biased diaphragm, which spring biased diaphragm is maintained within a bore in air communication with the atmosphere, the improvement which comprises a gas outlet in gas communicating relationship with said passageway, said gas outlet maintained within the same housing as said bore.

In a particularly desirable embodiment, this invention contemplates a regulator valve comprising a gas inlet, a flow regulating means, a tire valve bearing against a plate, which plate defines a gas passageway and which plate is biased by a spring biased diaphragm, which spring biased diaphragm is maintained within a bore in air communication with the atmosphere, a gas outlet in gas communicating relationship with said passageway, said gas outlet being maintained within the housing which contains said bore, wherein the gas regulator valve comprises at least two housings secured together to define at the said plate a passageway between said tire valve and said plate, said passageway continuing into the housing containing said bore.

BRIEF DESCRIPTION OF DRAWINGS

The present invention will be more readily understood when reference is made to the attached drawings in which.

DESCRIPTION OF SPECIFIC EMBODIMENT

Figures 1, 2:
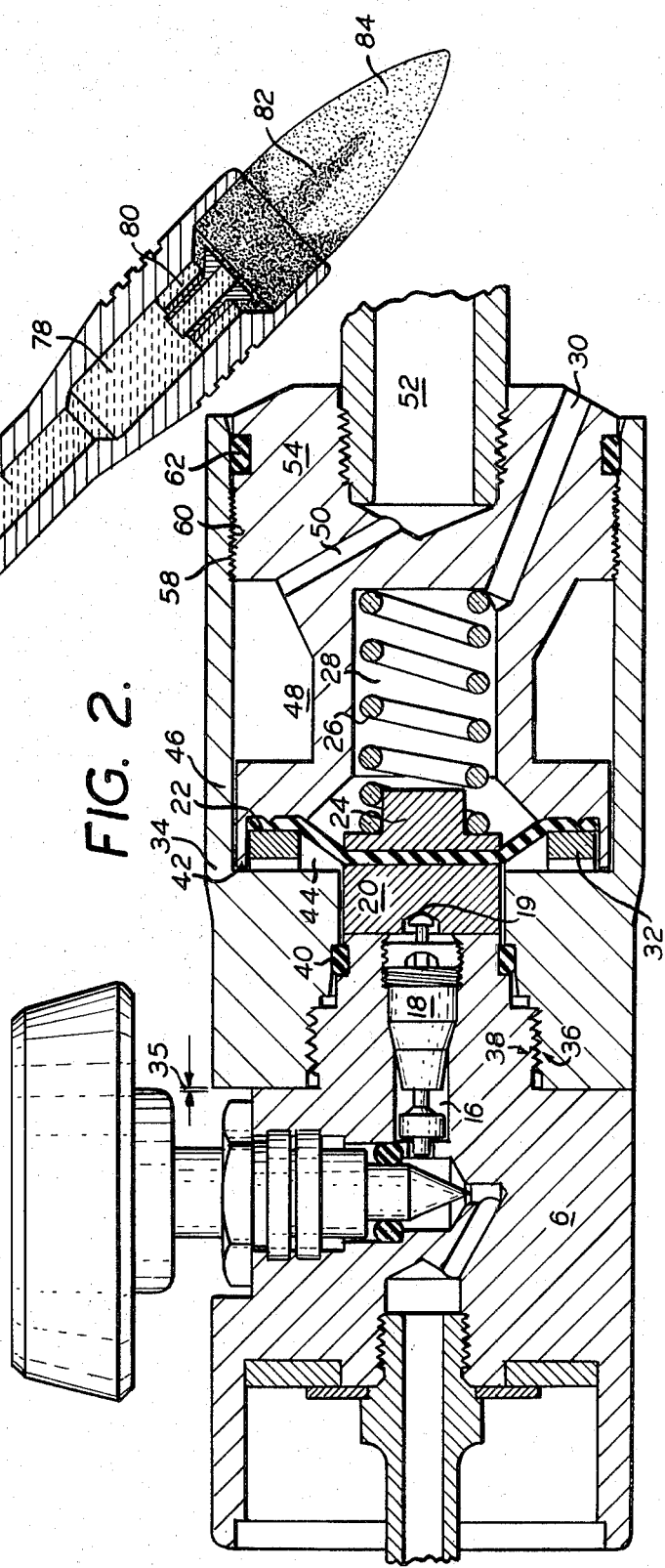
FIG. 1 is a sectional elevation of a gas regulator valve pursuant to the present invention, wherein provision is made to form a flame at the end of said valve. Thus a torch member is secured against the gas exit of the valve.
FIG. 2 is an enlarged sectional elevation similar to that shown in FIG. 1, but showing the parts in greater detail.

A preferred embodiment is shown in the attached Figures. In accordance with such embodiment, there is provided a gas inlet 2 which is adapted to enter a liquefied petroleum gas cylinder, especially of the portable type. The gas inlet terminates in a narrow defined passageway 4 maintained within a first housing 6. Passageway 4 termnates in chamber 8 in which there is fitted a needle 10 of needle valve 12 terminatng in an outwardly disposed knob member 14. The purpose of the needle valve is to regulate the flow of gas entering gas inlet 2 and passing through chamber 8.

Downstream of chamber 8 is a second chamber 16 in which sits a tire valve 18. The tire valve terminates in a stem 19 which bears against a plate 20. The plate 20 is the movable member which determines the extent to which stem member 19 moves inwardly or outwardly to allow passage of the gas in chamber 16 through the tire valve assembly 18. The regulation of the position of stem 19 and thus the flow of gas through the tire valve 18 is, in turn, regulated by the position of the diaphrahm 22 which bears against plate 20.

Diaphragm 22 in turn is positioned between the plate 20 and a plate 24 which is spring biased by coil spring 26 maintained within a central bore 28. To facilitate disposition of the diaphragm 22 against plate 20, and thus, stem 19, in response to ambient conditions, there is provided an air inlet 30 in communication with the central bore 28. The purpose of this is to permit the regulation of the gas passing through the regulator valve in response to the ambient conditions of temperature and pressure. The purpose of the gas regulator valve is to permit constant maintenance of a preset or preselected pressure, generally about 26 p.s.i. Thus, by presetting the spring 26 against plate 24, and thus against the diaphragm 22, means of adjusting distance 35 between housing 6 and housing 34 a constant resistance is maintained against the needle or stem 19. This changes only in response to changes in ambient conditions facilitated through use of the air inlet 30 in communication with the central bore 28. It should be understood that the air entering air inlet 30 does not mix with the gas. A seal is provided via a suitable washer, such as a diaphragm 22. The washer 32 is positioned to allow the diaphragm 22 to be positioned tightly against the internal metallic structure of the housing 54 containing the central bore 28. A secure fit is seen particularly in FIG. 2.

The assembly is constructed in essentially two parts wherein a first housing 6 is secured to the housing containing the bore 28 and air inlet 30. This is done by providing female threads on housing 34 at 36. These female threads engage corresponding male threads on the first housing 6, which male threads are shown at 38. Because such involves securing two housings together such that gas does not leak out of the junction, an O ring 40 is provided. The O ring 40 is positioned next to plate 20 to define one wall of passageway 42 alongside of plate 20 and defined by the body of housing 34. The passageway 42 continues into a generally circular chamber 44 which feeds a plurality of chambers running down the side of the housing but within the same and into an expansion area in the form of a ring 48. This expanded area communicates with a confined passageway 50 which terminates in the gas outlet 52.

It should be understood that the housing 34, which, as seen, contains the gas outlet 52 can be made in two parts. Indeed, in a preferred embodiment, such housing is made in two parts wherein the bore section containing the gas outlet and the air inlet is maintained within a male housing member 54 which can be correspondingly screwed into the outer wall of the housing 34. Thus, securement of such male portion is provided by providing female threads on the outer wall of housing 34 at 58 which engage corresponding male threads 60. Suitably, another O ring 62 prevents any leakage of gas from chamber 48 down through the junction between the male portion 54 and the external walls of the housing 34.

As seen in FIG. 1, the gas exit can terminate in an orifice 70 about which is positioned an O ring 72. An air hole 74 is provided on the side of said orifice to allow air to mix with the gas passing through the gas outlet and into the torch assembly positioned therebeneath. The torch assembly comprises a mixing tube 76 in communication with an expansion area 78 which terminates in a flame holder 80. The stippling in the drawing indicates the admixture of the gases and the relative concentration of flame at the tip of the torch. Specifically, the stippling at 82 shows portions of intense heat. Flame also exists in the area 84.

Operation of the valve is relatively simple. Gas passes into the gas inlet 2. The gas is at a pressure generally between 0 and 200 p.s.i. It passes thence through passageway 4 and into the chamber 8. Passage is regulated in chamber 8 and the adjoining chamber 9 through use of the needle 16 of the flow regulator 12. Gas passes out of the chambers 8 and 9 and into a chamber 16. It passes through the tire valve 18 in response to the position of the stem 19 bearing against plate 20, as indicated above. When the gas passes through the tire valve 18, it is at a pressure which is preselected, generally about 26 p.s.i. This pressure is provided through use of the spring biased diaphragm maintained within the bore 28, which diaphragm is regulated through use of air biasing thereagainst, the air being at the ambient external conditions, generally atmospheric pressure. Gas passes through the tire valve and enters passageways 44, 42, 46, 48, 50 and exits in gas exit 52.

The gas in gas exit 52, as seen in FIG. 1, passes into the area wherein it is mixed with air, as shown at air inlet 74. The LPG and air pass through mixing tube 76 and are formed into a flame at the end of the torch member.

It will be seen from the above, that there are several advantages obtained through this construction. One particular advantage is that it provides all of the advantages of the prior art assemblies, such as that shown in the aforementioned Webster patent, but provides the same in a unitary structure wherein the gas exit is maintained within the same housing as the bore. Additionally, the housing contains the air inlet which provides air biasing against the diaphragm. Output pressure can be preset by readily screwing and covering of the tire valve. Sealing is provided through use of strategically placed O rings which seal under the pressure in adjusting or setting. A secondary seal is provided by the locktight provided at the point where the male housing member 54 joins the external walls of the second housing 34 at threaded portions 58 and 60. The present valve maintains maximum use of space of the various housings and enables substantially better control of the LPG gas pressure passing through the valve assembly than was obtained in some of the prior art devices. Additionally, it provides gas at controlled rates to torch fittings. Such is particularly desirable when a torch is to be operated under extremes of temperature wherein the pressure regulation would normally be difficult.

It should be understood that the valve regulator of the present invention can be used in connection with gas burning appliances, such as stoves, torch lanterns and cooking devices in which the gas is passed through and burnt in a porous ceramic block. The gas inlet of the regulator is connected to a gaseous fuel supply particularly of the liquefied propane gas type wherein the empty cylinder is disposable. Screw threads are provided over the male connection of the cylinder, and the gas inlet 2 extends into the outlet opening of the cylinder forming a gas seal with, for instance, an O ring positioned in the cylinder outlet. The cylinder, when screwed down tight, effects a perfedct gas tight seal with the gasket shown in the gas inlet end of the valve regulator. For that purpose, appropriate sealing is provided generally at sealing 3.

The gas valve can be constructed of any suitable material. Desirably, it is constructed of durable metal parts, particularly brass, aluminum, or the like. It should be understood, however, that plastic parts, especially thermoplastic parts, can be utilized provided they are not attacked by the gases involved. Additionally, they should be resistant to high temperatures, especially if used in the torch assembly itself.

The terms and expressions used herein have been used as terms of description and not of limitation, as there is no intention, in the use of such terms and expressions, of excluding any equivalents, or portions thereof, as various modifications and departures will become apparent to one skilled in the art.

What is claimed is:

1. Gas regulator valve comprising elongated housing means containing a gas inlet, a gas passageway therethrough and a gas outlet, and in said passageway in axial alignment with the housing means, tire valve means and pressure regulating means, flow regulating means between the gas inlet and the tire valve means, said pressure regulating means including flexible diaphragm means secured to the walls of the housing and biased against the tire valve means by spring means contained in a bore located in said housing, said bore being axially aligned with said housing, said gas inlet, said gas outlet, and said tire valve means, said bore having an air inlet communicating with the atmosphere, said pressure regulating means and said housing defining a portion of the gas passageway which diverges from the axis of said bore upstream thereof, said housing defining the next portion of the gas passageway which communicates with the gas outlet and which is annularly positioned about said bore.

2. Gas regulator valve comprising
   a. first housing means having a gas inlet, flow regulating means and tire valve means;
   b. second housing means joined with the first housing means having an axially aligned bore, pressure regulating means including diaphragm means, plate means carried by the diaphragm contacting said tire valve means and spring means in said bore biasing said diaphragm means against said tire valve means, an air inlet to said bore communicating with the atmosphere and a gas outlet; and
   c. said pressure regulating means and said first housing defining a portion of the gas passageway through the regulator which diverges from the axis of said bore upstream thereof, said first and second housings defining the next portion of the gas passageway which communicates with the gas outlet and which is annularly positioned about said bore.

3. Regulator valve of claim 2 wherein said next portion of the gas passageway includes an annular expansion area defined by the first and second housing means.

4. Regulator valve of claim 2 wherein said flow regulating means is a needle valve.

5. Regulator valve of claim 2 having a torch fitting attached adjacent the gas outlet and including an air inlet, a mixing tube and flame holder.

6. Regulator valve of claim 2 wherein said diaphragm means is secured to the walls of said second housing means by washer means.

7. Regulator valve of claim 2 wherein seal means are included between the housing means.

8. Regulator valve of claim 2 wherein the housing means are adapted to set regulated pressure by varying the spring load against said diaphragm means and are provided with means to prevent tampering of the setting once made.

9. Portable gas burning appliance comprising LPG cylinder means, gas regulator means and gas burning means, said regulator means comprising a housing axially connecting the cylinder means by a gas inlet and the gas burning means by a gas outlet via a gas passageway, flow regulating means, tire valve means and pressure regulating means in said passageway, said pressure regulating means including a bore, said bore being axially aligned with said housing, said gas inlet, said gas outlet, and said tire valve means, diaphragm means biased against the tire valve means by spring means in said bore, an air inlet to said bore communicating with the atmosphere, said diaphragm means defining in conjunction with the housing a portion of said gas passageway which diverges from the axis of said bore upstream thereof, said housing defining the next portion of said gas passageway which is annularly positioned about said bore in communication with said gas outlet.

10. Portable appliance of claim 9 wherein said next portion of the gas passageway includes an annular expansion area.

11. Portable appliance of claim 9 wherein said gas burning means is a torch.

* * * * *